United States Patent [19]
Burgoyne et al.

[11] Patent Number: 5,636,518
[45] Date of Patent: Jun. 10, 1997

[54] OPERATING MECHANISM FOR A HYDRAULIC MASTER CYCLINDER

[75] Inventors: Kevin Burgoyne, Long Itchington; Richard A. Bass, Cubbington, both of United Kingdom

[73] Assignee: Automotive Products, plc, Leamington Spa, England

[21] Appl. No.: 341,609

[22] PCT Filed: Mar. 18, 1994

[86] PCT No.: PCT/GB94/00564

§ 371 Date: Nov. 17, 1994

§ 102(e) Date: Nov. 17, 1994

[87] PCT Pub. No.: WO94/21510

PCT Pub. Date: Sep. 29, 1994

[30] Foreign Application Priority Data

Mar. 20, 1993 [GB] United Kingdom ............... 9305838

[51] Int. Cl.⁶ ..................................................... B60T 7/02
[52] U.S. Cl. ..................................................... 60/594
[58] Field of Search ................................ 60/533, 594

[56] References Cited

U.S. PATENT DOCUMENTS 2,199,863  5/1940  Wehr ............................. 60/594 X
2,766,585 10/1956  Wittren ........................... 60/594
3,048,980  8/1962  Cousino et al. ................... 60/594
3,146,597  9/1964  Knauss ........................... 60/594 X
4,560,049 12/1985  Uchibaba .
5,050,381  9/1991  Matsuno et al. .................. 60/594 X

FOREIGN PATENT DOCUMENTS 0476324  3/1992  European Pat. Off. .
2460833  1/1981  France .
 675865  5/1939  Germany ......................... 60/594
8913278  4/1990  Germany .
2011563  7/1979  United Kingdom ............... 60/594
8703850  7/1987  WIPO .

*Primary Examiner*—Hoang Nguyen
*Attorney, Agent, or Firm*—Paul E. Milliken; Lee A. Germain

[57] ABSTRACT

An operating lever mechanism for a master cylinder which includes a mounting bracket (12) and a lever (23) mounted on the bracket trough a pivot pin (22). The lever is connected to a master cylinder actuating rod (25) and the pivot pin (22) is adjustably mounted on the bracket in slots (27) so that by turning an adjuster wheel (31) the pin (22) is moved in the slots (27) to vary the distance between the pivot axis of the lever and the connection of the lever with the master cylinder actuating rod (25) to adust the operating lever ratio of the mechanism as desired.

13 Claims, 4 Drawing Sheets

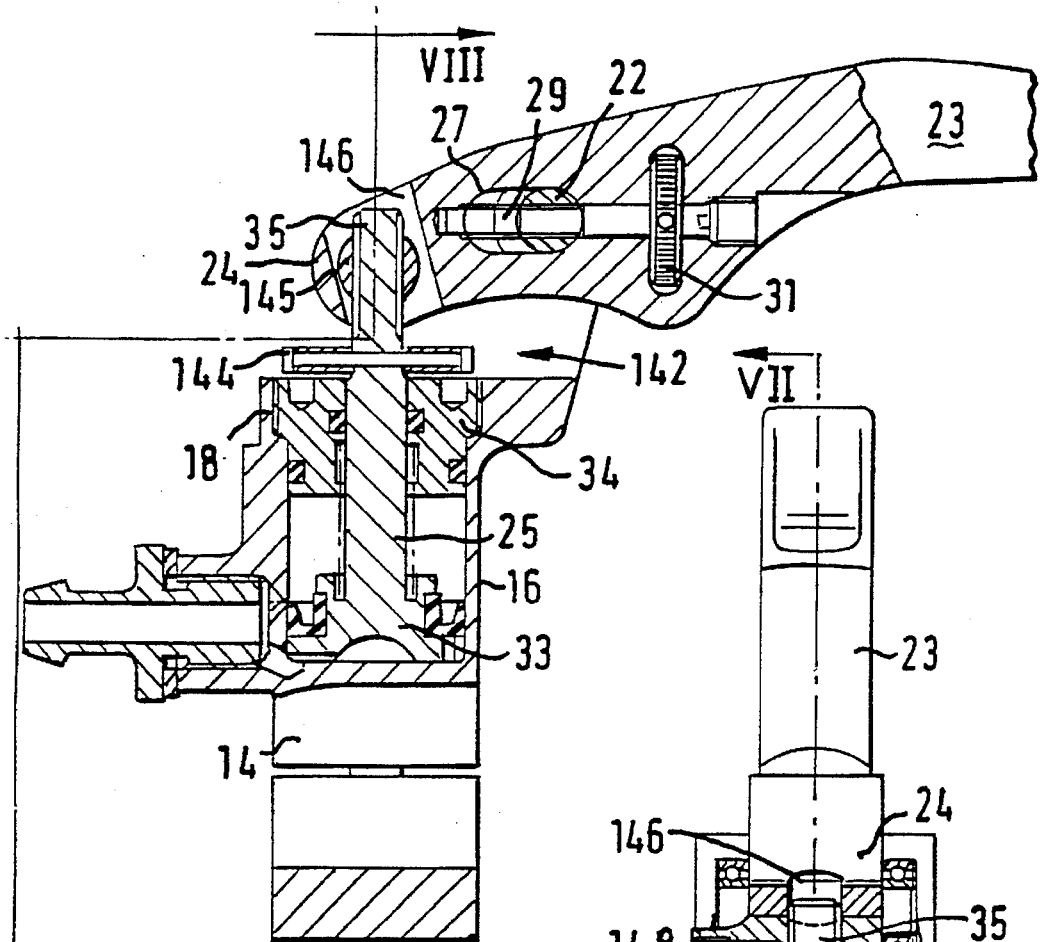
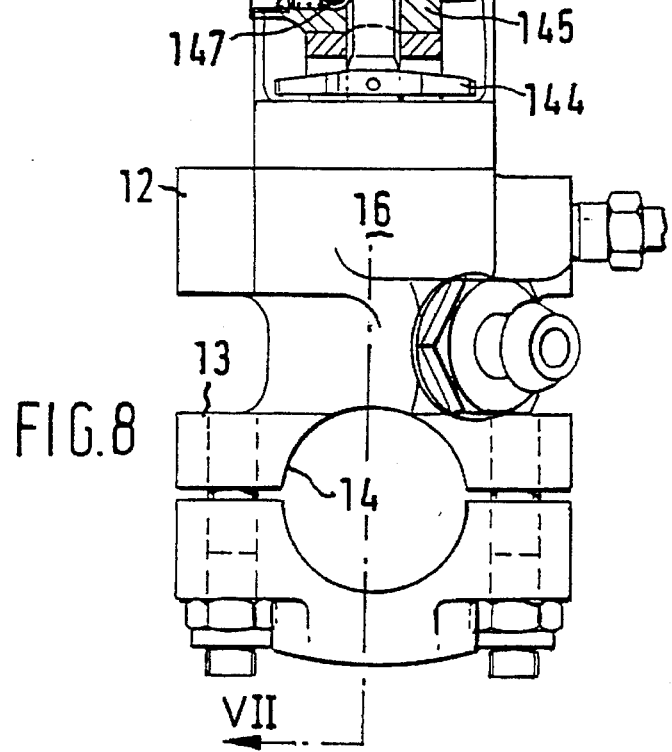
FIG.7
FIG.8

OPERATING MECHANISM FOR A HYDRAULIC MASTER CYCLINDER

This invention relates to operating mechanisms for master cylinders and particularly to mechanisms fitted to handlebars of motorcycles for operation of a hydraulic mastercylinder through a hand operated lever.

The load required to operate a hydraulic system is proportional to the load applied to the operating lever to build up the hydraulic pressure. The input load acting on the operating lever is multiplied by the ratio of the distance from the lever pivot to the point of application of the input load, to the distance from the lever pivot to the point of application of the output load. This output load may constitute the direct input to the master cylinder or may be fed into other levers before being fed into the master cylinder.

In some applications it is known to vary the effort required at the operating lever by varying the lever position so that the operating feel is adjustable as is desired by the operator. Such lever arrangements are shown in GB2226 112-A and in U.S. Pat. No. 5,050,381.

The present application provides a means of altering the effective lever ratio of the operating lever which is simple and effective.

Accordingly there is provided an operating lever mechanism for a master cylinder and which comprises a mounting bracket, a lever mounted on the bracket through a pivot pin and which is connectable to a master cylinder actuating rod, the mechanism being characterised in that the pivot pin is adjustably mounted on the bracket so that the operating lever ratio can be adjusted as desired.

Conveniently the bracket is for mounting on a handlebar and the lever is a hand operable lever.

Preferably, the lever is connectable to the actuating rod at one end of the lever, and the pivot pin is located adjacent said one end such that when the operating load is applied at the other end of the lever, said one end moves to apply a pull load to the actuating rod.

Conveniently the assembly includes a master cylinder body which is formed integrally with the mounting bracket, and the actuating rod is coaxial of the master cylinder bore and is connected to lever through a screw-threaded adjustable connection which allows the lever to be set in a desired orientation relative to the bracket.

The present invention will be described, by way of example only, and with reference to the accompanying drawings in which:

FIG. 7 is a sectional view on line VII—VII of FIG. 8 through a second operating lever also according to the invention, and FIG. 8 is a sectional view on the line VIII—VIII of FIG. 7.

Figure 1:
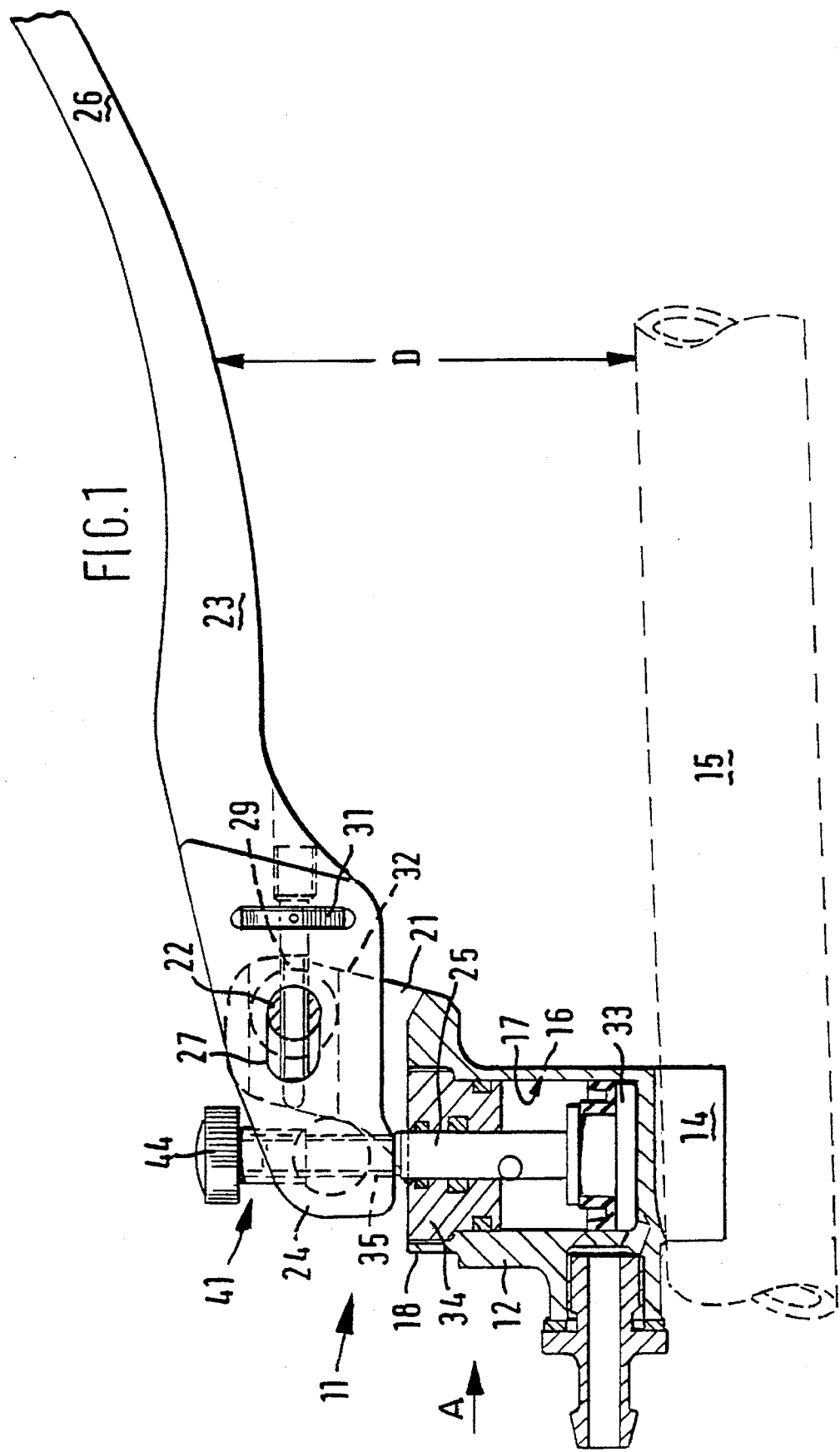
FIG. 1 is a sectional view of a master cylinder assembly having an operating lever according to one aspect of the present invention.
Figure 2:
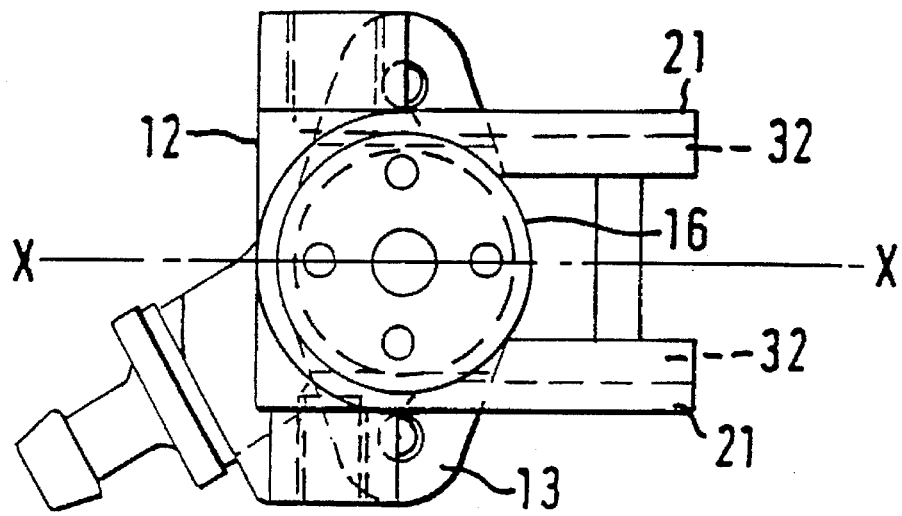
FIG. 2 is an end view of a mounting bracket and integral master cylinder as used in the assembly in FIG. 1.
Figure 3:
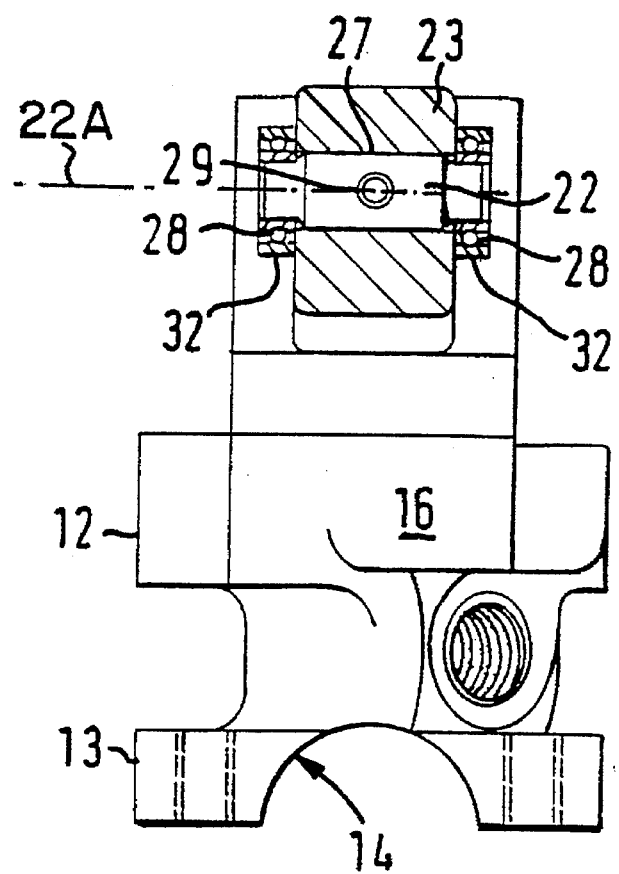
FIG. 3 is an enlarged view of the bracket taken in the direction of arrow A as FIG. 1 showing the lever in cross section.

With reference to FIGS. 1 to 3, there is illustrated a hydraulic master cylinder assembly 11 for mounting on the handlebars 15 of the motorcycle. The master cylinder assembly 11 could be utilised to operate hydraulic brakes or a hydraulically operated clutch.

The master cylinder assembly 11 comprises a mounting bracket 12 having a flange 13 with a concave cylindrical mounting surface 14 for attachment to a pair of handlebars 15 (shown in dotted outline only). The bracket includes a master cylinder body 16 formed integrally therewith having a master cylinder bore 17 with its blind end adjacent the concave mounting surface 14 and an open end 18 away from said concave surface such that the axis of the bore 17 is substantially normal to the longitudinal axis X—X (see FIG. 2) of the mounting surface.

The mounting bracket 12 has a pair of spaced lugs 21 that project therefrom and which support a pivot pin 22 with a pivot axis 22a for an operating lever 23. The lever 23 has one end 24 thereof connected to an actuating rod 25 of the master cylinder 16 with its free end 26 shaped for operation by hand so as to pull said free end 26 towards the handlebars 15.

The pivot pin 22 is located adjacent said one end 24 of the lever so that when the operating load is applied to the free end 26 of the lever the one end 24 moves away from the handlebars 15 to exert a pull load on the actuating rod 25. The pin 22 is located in an elongated slot 27 in the lever 23 and carries a plain or caged ball bearing 28 at each end. The slot 27 guides the pin 22 for movement along the slot 27, which is controlled by a screw thread strut 29 which engages a threaded bore in the pin. The strut has an adjuster wheel 31 fixed thereto to facilitate adjustment of the pin position along the slot 27.

Bearings 28 at each end of the pivot pin 22 engage in aligned opposing slots 32 in the lugs 21. The slots 32 extend substantially parallel to the axis X—X and guide the bearings 28 for movement along the opposed slots 32. Adjustment of the wheel 31 turns the strut 29 causing movement of the pivot along the slot 27, thus adjusting the travel ratio of the lever mechanism.

The actuating rod 25 of the master cylinder is connected at one end to a piston 33 sealingly reciprocal within the bore 17, and extends through the open end 18 for connection to the lever 23. The rod 25 is sealingly guided for movement in a bearing cap 34 which closes the mouth 18 of the bore 17 and holds the rod 25 coaxially aligned with the axis of the bore 17. The outer end portion 35 of the rod 25 is screw-threaded for connection to a second adjuster 41 mounted in the lever end 24.

Figure 4:
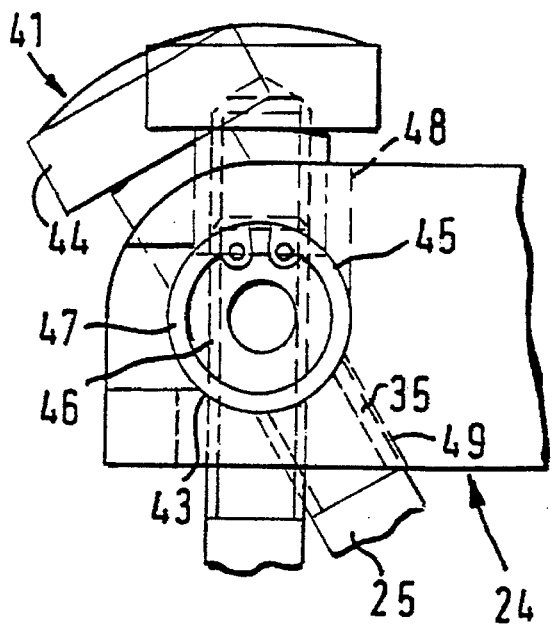
FIG. 4 is an enlarged view of the connection between the lever and the master cylinder actuating rod.
Figure 5:
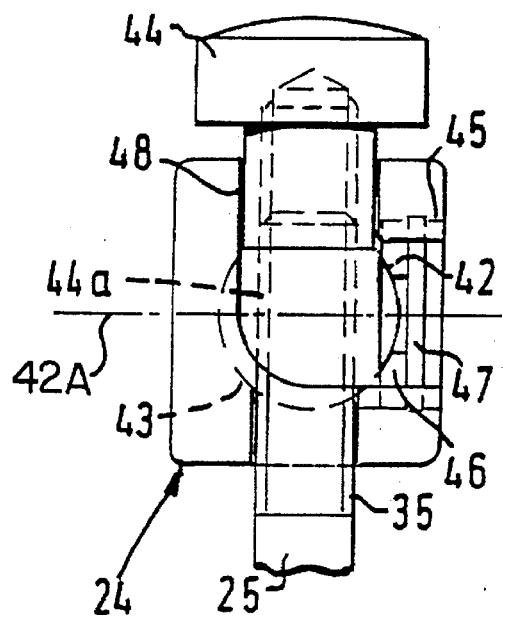
FIG. 5 is an end view of the lever and the connection shown in FIG. 4.
Figure 6:
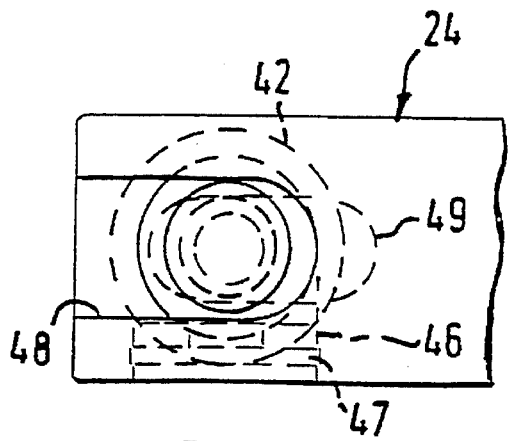
FIG. 6 is a view of the top side of the lever end of FIG. 4.

The second adjuster 41 is shown in detail in FIGS. 4–6 in which the lever end 24 is shown in enlarged detail. The adjuster 41 comprises a spherical nut 42 which engages in a spherical seat 43 in the lever end 24 forming a ball joint connection. The spherical nut has a adjuster wheel 44 affixed thereto and a screw-threaded bore 44a therein which can accommodate the screw threaded end portion 35 of the rod 25. The spherical nut 42 is located onto the seat 43 through an opening 45 in the side of the lever end 24 and is held in place by a retaining washer 46 and circlip 47. The lever end 24 has further openings 48,49 to accommodate the movement of the spherical nut 42 and rod 25 relative to the lever end during operation of the master cylinder.

The second adjuster 41 allows the adjustment of the distance 'D' between the handlebar 15 and the lever 23 so that the distance 'D' can be set for the maximum convenience of the operator. Because the lever end 24 is held on the master cylinder axis by the joint connection 42,43 on the end of the rod 25, the slots 32, 27 in the bracket 12 and lever 23 respectively, allow for relative movement between the pivot pin 22 and the lever and bracket during pivotting of the lever 23 about the axis 42A of the ball joint connection 42,43.

With reference to FIGS. 7 and 8, the embodiment shown therein differs only in the connection between the master cylinder actuating rod 25 and the hand lever 23, and those components which are identical, or substantially identical to components in the first embodiment described with reference to FIGS. 1 to 6, carry the same reference numbers.

The second adjuster 142 comprises an adjuster wheel 144 which is keyed rotationally fast onto the actuating rod 25 externally of the bearing cap 34.

The threaded end portion 35 of the rod 25 makes a screw-threaded connection with a connecting pin 145. The pin 145 is held in a circular hole in one end 24 of the lever. The lever end 24 has a slot 146 therein to accommodate relative movement of the actuating rod 25.

The connecting pin 145 has a spring-load ball 147 therein mounted radially of the actuating rod 25. The ball 147 is biased by spring 148 against at least one detent surface on the threaded portion 35 of the actuating rod so that the ball positively locks in the detent after regular amounts of adjustment of the wheel 144. During adjustment of the wheel 144 the piston will also be caused to rotate.

In a still further alternative construction (not shown) the adjustor wheel 144 of FIGS. 7 and 8 is eliminated and replaced by an axially extending allen key socket formed in the end of the threaded portion 35 of the actuating rod 25. With this construction an allen key is inserted into this socket via slot 146 to rotate actuating rod 25 thus adjusting the orientation of lever 23 as described above.

We claim:

1. An operating lever mechanism for a master cylinder, the operating lever mechanism comprising: a mounting bracket (12), a lever (23) mounted on the bracket via a pivot axis (22A) provided by a pivot pin (22), the lever (23) having a pivotal connection about a pivot axis (42A) with a master cylinder actuating rod (25), the pivot axis (42A) being fixed relative to the lever and in which the pivot pin (22) is adjustably mounted (27, 28, 29, 31) on the bracket via adjustment means so that the distance between the pivot axis (22A) of the lever and the connection of the lever with the master cylinder actuating rod can be varied to adjust the operating lever ratio as desired.

2. A lever mechanism as claimed in claim 1 characterised in that the mounting bracket (12) is for mounting the mechanism to a handlebar (15), and the lever (23) is a hand operable lever.

3. A lever mechanism as claimed in claim 1 characterised in that the lever (23) is connectable to the actuating rod (25) at one end (24) of the lever, and the pivot pin (22) is located adjacent said one end (24) such that when an operating load is applied to the other end (26) of the lever, said one end (24) moves to apply a pull load to the actuating rod (25).

4. A lever operating mechanism as claimed in claim 1 wherein the bracket (12) includes a pair of aligned slots (27) in which the pivot pin (22) is slideably guided, the pin (22) being screw-threadedbly connected to a screw strut (29) having an adjuster wheel (31) thereon so that operation of the adjuster wheel causes the pin (22) to move along the strut (29) guided by the slots (27).

5. A lever mechanism as claimed in claim 4 characterised in that the pivot pin (22) is connected to the mounting bracket (12) through bearings (28) located one bearing at each end of the pin, the bearings engaging in a respective aligned slot (27) in the bracket (12).

6. A lever mechanism as claimed in claim 3, characterised in that the lever (23) is connectable to the actuating rod (25) through a screw-threaded adjustable connection (35,42,43, 44,46,47) which allows the lever (23) to be set in a desired orientation relative to the bracket.

7. A lever mechanism as claimed in claim 6 characterised in that the screw-threaded connection comprises a spherical nut (42) having an adjuster wheel (44) affixed thereto.

8. A lever mechanism as claimed in claim 6 characterised in that the screw-threaded connection comprises a screw-threaded bore in a pin (145) which extends through the lever (23), the screw threaded bore being engaged by a screw-threaded portion (35) of the actuating rod, (25) and in that the actuating rod is rotatable to adjust the lever orientation.

9. A lever mechanism as claimed in claim 8 characterised in that detent means (47,48) are provided in the screw-threaded connection to hold the lever (23) in discrete adjusted orientations.

10. A master cylinder assembly including a operating lever mechanism as claimed in claim 1, the assembly being characterised by the inclusion of a master cylinder body (16) formed integrally with the mounting bracket (12).

11. An assembly as claimed in claim 10 characterised in that the master cylinder body (16) has a master cylinder bore (17) therein having a mouth (18) and a closed end and in which a piston (33) is sealingly reciprocal, and the actuating rod (25) is arranged coaxially of the bore and is connected at one end to the piston, the rod being sealingly guided in a bearing cap (34) which closes the mouth of the bore.

12. An operating lever mechanism for a master cylinder, the operating lever mechanism comprising a mounting bracket (12), a lever (23) mounted intermediate each end (24,26) of the lever on the bracket via a pivot axis (22A) provided by a pivot pin (22), the lever (23) being connected at one end (24) with a master cylinder actuating rod (25) and in which the pivot pin (22) is adjustably mounted (27, 28, 29, 31) on the bracket via adjustment means so that the distance between the pivot axis of the lever and the connection of the lever with the master cylinder actuating rod can be varied to adjust the operating lever ratio as desired and when an operating load is applied to the other end (26) of the lever (23), the said one end (24) moves to apply a pull load to the actuating rod (25).

13. An operating lever mechanism for a master cylinder, the operating lever mechanism comprising a mounting bracket (12) with a pair of aligned slots (27), a lever (23) mounted on the bracket via a pivot axis (22A) provided by a pivot pin (22), the lever (23) having a connection with a master cylinder actuating rod (28) and in which the pivot pin (22) is adjustably mounted (27, 28, 29, 31) in the aligned slots (27) of the bracket via a screw threaded connection with a screw strut (29) having an adjuster wheel (31) thereon so that operation of the adjuster wheel causes the pin (22) to move along the strut (29) guided by the slots (27) and vary the distance between the pivot axis of the lever and the connection of the lever with the master cylinder actuating rod to adjust the operating lever ratio as desired.

* * * * *